(12) United States Patent
Lee

(10) Patent No.: US 6,748,965 B2
(45) Date of Patent: Jun. 15, 2004

(54) DOUBLE DIRECTIONAL CHECK VALVE AND FLOW RESTRICTOR COMBINATION

(75) Inventor: Hang-Chung Lee, Taoyuan (TW)

(73) Assignee: Taiwan Semiconductor Manufacturing Co. Ltd, Hsin Chu (TW)

( * ) Notice: Subject to any disclaimer, the term of this patent is extended or adjusted under 35 U.S.C. 154(b) by 79 days.

(21) Appl. No.: 10/140,415

(22) Filed: May 6, 2002

(65) Prior Publication Data

US 2003/0205271 A1 Nov. 6, 2003

(51) Int. Cl.$^7$ ............................................. F16K 11/20
(52) U.S. Cl. ................. 137/118.01; 137/512; 137/513; 137/883; 137/118.06; 251/122; 138/45
(58) Field of Search ................................ 137/504, 512, 137/513, 517, 543.15, 613, 614.2, 872, 877, 878, 881, 883, 118.01, 118.06, 119.01, 119.03, 119.04, 101, 87.05; 251/118, 120, 121, 122; 138/45

(56) References Cited

U.S. PATENT DOCUMENTS

| | | | | |
|---|---|---|---|---|
| 135,220 A | * | 1/1873 | Harang | |
| 1,555,075 A | * | 9/1925 | Pownall | |
| 3,120,243 A | * | 2/1964 | Allen et al. | 137/504 |
| 3,431,944 A | * | 3/1969 | Sakuma | 138/45 |
| 4,437,493 A | * | 3/1984 | Okuda et al. | 138/45 |
| 4,525,183 A | * | 6/1985 | Cordes et al. | 96/113 |
| 4,867,198 A | * | 9/1989 | Faust | 137/503 |
| 5,373,873 A | * | 12/1994 | Miller et al. | 141/18 |

* cited by examiner

*Primary Examiner*—Ramesh Krishnamurthy
(74) *Attorney, Agent, or Firm*—Tung & Associates

(57) ABSTRACT

A double directional check valve and flow restrictor combination including a housing which contains a pair of axially-aligned check valves and a flow restrictor disposed between the check valves. Dry purge air flows into the housing through the flow restrictor, which facilitates smooth and uniform flow of the air, and out of one of the check valves to a dessicant chamber to dry or regenerate dessicant in the chamber. The housing is fitted with flanges or other connection structures for quick, easy and convenient attachment of the housing to a piping network in an air, nitrogen or other process drying system.

20 Claims, 2 Drawing Sheets

DOUBLE DIRECTIONAL CHECK VALVE AND FLOW RESTRICTOR COMBINATION

FIELD OF THE INVENTION

The present invention relates to drying compressed air and more particularly, to a double directional check valve and flow restrictor combination which is capable of drying compressed air, nitrogen or other process gas for use in the production of semiconductors.

BACKGROUND OF THE INVENTION

In the semiconductor production industry, clean dry air, nitrogen and other gases are frequently used in the processing of semiconductor wafers. These processing gases typically must contain a very low moisture content in order to prevent manufacturing defects in the integrated circuits on the wafers. For example, during the semiconductor fabrication process, a semiconductor die is attached to a leadframe and encapsulated in plastic. Any moisture remaining on the semiconductor wafer from the semiconductor processing steps can be absorbed from the semiconductor wafer into the package interior and lead to one of several failure mechanisms.

A minimum package moisture content accepted in the semiconductor industry is 0.04 percent, or $1/2500$ of the total weight of the package. Any moisture content which exceeds this level may cause a "popcorn" failure, in which the moisture is vaporized and increases the internal pressure of the package. Consequently, the package may pop or fracture along the seams. Replacing the semiconductor device is expensive and time-consuming, and may result in damage to the printed circuit board.

A moisture absorbing-type drying system is commonly used in the semiconductor industry for drying compressed air, nitrogen or other process gas. This type of drying system uses dessicant to produce dry air from air having a relatively dry moisture content. The system uses two check valves and a flow restrictor which are installed as separate units. The valve housings, flow restrictor housing and connecting piping for the system occupy a relatively large volume of valuable space. Furthermore, poor purge efficiency in such systems increases operating costs due to waste of purge air.

SUMMARY OF THE INVENTION

It is therefore an object of the present invention to consolidate usage of space in the production of clean, dry air, nitrogen or other process gas.

Another object of the present invention is to provide a flow restrictor and check valve combination in a single housing.

Still another object of the present invention is to provide a double directional check valve and flow restrictor combination which is capable of drying compressed air, nitrogen or other process gas for use in the production of semiconductors.

Yet another object of the present invention is to provide a double directional check valve and flow restrictor combination which can be easily and conveniently installed.

A still further object of the present invention is to provide a double directional check valve and flow restrictor combination which is simple in construction.

Yet another object of the present invention is to provide a double directional check valve and flow restrictor combination which enhances purge efficiency to save purge air volume and cost in a compressed air drying system.

Another object of the present invention is to provide for constant flow of air for the drying of desiccant in an air drying system.

In accordance with these and other objects and advantages, the present invention comprises a T-shaped housing which contains a pair of axially-aligned check valves and a flow restrictor disposed between the check valves. Dry purge air flows into the housing through the flow restrictor, which facilitates smooth and uniform flow of the air, and out of one of the check valves to a dessicant chamber to dry or regenerate dessicant in the chamber. The housing is fitted with flanges or other connection structures for quick, easy and convenient attachment of the housing to a piping network in an air, nitrogen or other process drying system.

BRIEF DESCRIPTION OF THE DRAWINGS

The present invention will now be described, by way of example, with reference to the accompanying drawings, in which.

DESCRIPTION OF THE PREFERRED EMBODIMENTS

The present invention has particularly beneficial utility in application to drying air, nitrogen and other process gases in the semiconductor production industry. However, the invention is not so limited in application and while references may be made to semiconductor processing and production, the invention may be more generally applicable to drying air or other gases in a variety of industrial and product applications.

Figure 1:
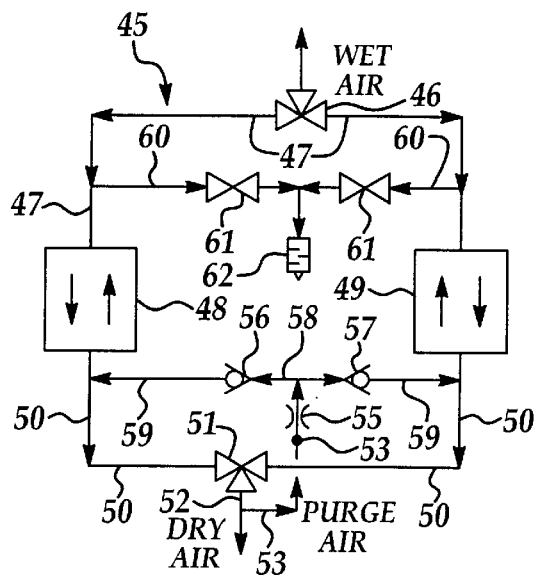
FIG. 1 is a schematic view of a conventional air drying system suitable for implementation of the present invention.
Figure 2:
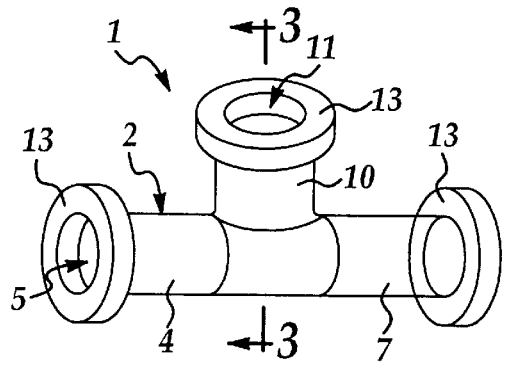
FIG. 2 is a perspective view of an illustrative embodiment of the double directional check valve and flow restriction combination of the present invention.

Referring initially to FIG. 1 of the drawings, a conventional air drying system for drying air, nitrogen or other process gases in a semiconductor production facility is generally indicated by reference numeral 45 and includes a source (not illustrated) of relatively humid air which is initially introduced under pressure into diverging wet air lines 47 through a common valve 46. One of the wet air lines 47 feeds a first dessicant chamber 48, and the other of the wet air lines 47 feeds a second dessicant chamber 49. The first dessicant chamber 48 and the second dessicant chamber 49 each includes a working chamber (not illustrated) which contains a supply of dessicant (not illustrated), typically dialuminum trioxide ($Al_2O_3$), for capturing moisture in the wet air that flows into the first dessicant chamber 48 and second dessicant chamber 49 through the respective wet air lines 47. The first desiccant chamber 48 and second desiccant chamber 49 each further includes a regenerating chamber (not illustrated) which dries or regenerates saturated desiccant, as hereinafter described. Dry air emerges from the working chamber of each first dessicant chamber 48 and second dessicant chamber 49 through respective dry air lines 50, and the dry air is fed through a valve 51 in a dry air dispensing line 52 for delivery to a desired destination such as a semiconductor wafer process chamber or furnace (not illustrated).

After prolonged operation of the conventional air drying system 45, the saturation level of the desiccant in the working chamber of the respective first desiccant chamber 48 and second desiccant chamber 49 approaches or becomes equal to the saturation level of the wet air entering the chambers through the wet air lines 47, such that transfer of moisture from the wet air to the desiccant is minimal or nonexistent. Therefore, the wet desiccant in the working chamber of each desiccant chamber 48, 49 must be dried, or regenerated, in order for effective drying of the air in the chambers 48, 49. Accordingly, a dry air purge line 53 extends from the dry air dispensing line 52 for diverting some of the dry air back to the first dessicant chamber 48 or the second dessicant chamber 49 to facilitate drying the dessicant in the regeneration chamber of the respective first desiccant chamber 48 or second desiccant chamber 49. Because the desiccant in both chambers generally does not become saturated at the same time, the saturated desiccant in one of the desiccant chambers 48, 49 can be regenerated while the other desiccant chamber remains functional.

An air flow restrictor 55 is provided in the dry air purge line 53, and connecting lines 58 connect the air flow restrictor 55 to a first chamber check valve 56, which leads to the first desiccant chamber 48 through a purge air return line 59 and the dry air line 50, and to a second chamber check valve 57, which leads to the second desiccant chamber 49 through a purge air return line 59 and the dry air line 50. The air flow restrictor 55 regulates the flow of dry air through the dry air purge line 53, to provide a smooth or uniform flow of the dry air to the first desiccant chamber 48 or second desiccant chamber 49. The first chamber check valve 56 and second chamber check valve 57 prevent backflow of air from the purge air return lines 59 to the dry air purge line 53. After regenerating the saturated desiccant in the regeneration chamber of the first desiccant chamber 48 or second desiccant chamber 49, the dry purge air is fed back through the corresponding wet air line 47, through a purge air exhaust line 60 and through a purge air exhaust valve 61 to a purge exhaust muffler 62.

In the conventional air drying system 45, the air flow restrictor 55, first chamber check valve 56 and second chamber check valve 47 are installed as separate units. Because these separate units must be connected to each other via the dry air purge line 53 and connecting lines 58, valuable space is occupied and installation and/or removal is complex and time-consuming.

Figure 3:
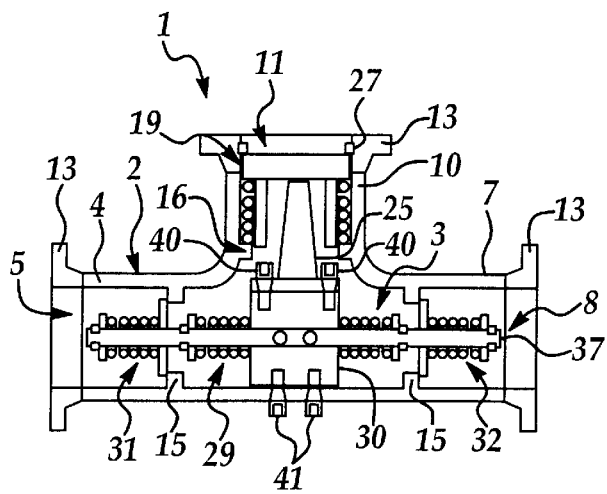
FIG. 3 is a sectional view, taken along section lines 3—3 in FIG. 2, of the present invention.

Referring next to FIGS. 2–8 of the drawings, an illustrative embodiment of the double directional check valve and flow restrictor combination, hereinafer referred to as the combination, of the present invention is generally indicated by reference numeral 1. The combination 1 includes a T-shaped housing 2, having a first poppet valve arm 4, a second poppet valve arm 7 and a flow restrictor arm 10 disposed in perpendicular relationship to the first poppet valve arm 4 and the second poppet valve arm 7. As illustrated in FIG. 3, the first poppet valve arm 4, the second poppet valve arm 7 and the flow restrictor arm 10 define a first poppet valve arm interior 5, a second poppet valve arm interior 8 and a flow restrictor arm interior 11, respectively. One of a pair of annular poppet valve retainer flanges 15 separates the first poppet valve arm interior 5 from a housing interior 3, and the other poppet valve retainer flange 15 separates the second poppet valve arm interior 8 from the housing interior 3. An annular spring retainer 16 separates the flow restrictor arm interior 11 from the housing interior 3. The first poppet valve arm 4, the second poppet valve arm 7 and the flow restrictor arm 10 of the housing 2 is each typically fitted with a housing flange 13 for purposes hereinafter described.

Figure 4:
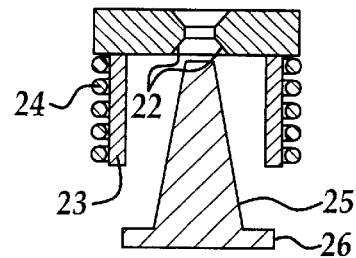
FIG. 4 is a cross-sectional view of an air flow restrictor assembly component of the present invention illustrated in FIG. 3.

An air flow restriction assembly for the combination 1 is generally indicated by reference numeral 19 in FIGS. 3 and 4. The air flow restriction assembly 19 includes a taper cone 25 having a base 26 which, as illustrated in FIG. 3, is mounted on a holding block 30 typically by means of taper cone base lock screws 40. As further illustrated in FIG. 3, the holding block 30 is secured to the interior surface of the housing 2, inside the housing interior 3 typically by means of a pair of holding block lock screws 41. The air flow restrictor assembly 19 further includes a typically cylindrical or disc-shaped orifice poppet 20, provided with a central air flow orifice 21 including a cone seat 22, and a restrictor cylinder 23 extends from a surface of the orifice poppet 20. The orifice poppet 20 is slidably mounted in the flow restrictor arm interior 11, and the stationary taper cone 25 is positioned just beneath the central air flow orifice 21, as illustrated in FIG. 4. A restrictor spring 24 in the flow restrictor arm interior 11 is interposed between the annular spring retainer 16 and the orifice poppet 20, and encircles the restrictor cylinder 23. The restrictor spring 24 normally biases the orifice poppet 20 away from the tip of the taper cone 25 and against a retainer ring 27 provided in the interior walls of the flow restrictor arm 10. Accordingly, the orifice poppet 20 is capable of movement in the flow restrictor arm interior 11 against the restrictor spring 24 such that the air flow orifice 21 approaches and may receive the upper end of the taper cone 25 to restrict flow of air through the air flow orifice 21, as illustrated in FIG. 6 and hereinafter described.

Figure 5:
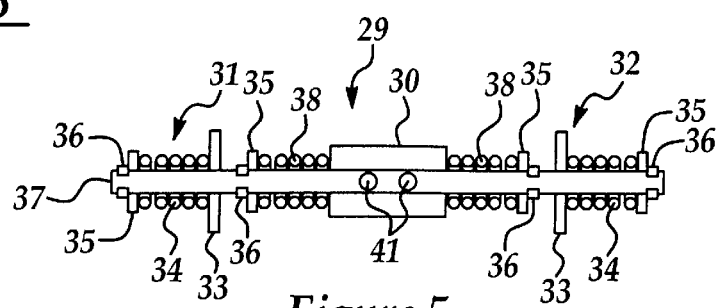
FIG. 5 is a bottom view, in section, of a valve assembly component of the present invention illustrated in FIG. 3.

A valve assembly for the combination 1 is generally indicated by reference numeral 29 in FIGS. 3 and 5, and includes an elongated valve mount rod 37 which slidably extends through the holding block 30. A first poppet valve 31 and a second poppet valve 32 are mounted on respective end portions of the valve mount rod 37, inside the first poppet valve arm interior 5 and the second poppet valve arm interior 8, respectively. The first poppet valve 31 and the second poppet valve 32 each includes a valve disc 33, slidably mounted on the valve mount rod 37. A retainer disc 35, typically held in place by a securing nut 36, is mounted on each end of the valve mount rod 37. A valve spring 34 is interposed between the valve disc 33 and the retainer disc 35. As illustrated in FIG. 3, the valve spring 34 normally biases the valve disc 33 against the corresponding poppet valve retainer flange 15 of the housing 2 to seal the housing interior 3 from the corresponding first poppet valve arm interior 5 and second poppet valve arm interior 8. The valve assembly 29 further includes a pair of spacer springs 38, each of which is interposed between the holding block 30 and a retainer disc 35 mounted on the valve mount rod 37 typically by means of a securing nut 36.

Figure 7:
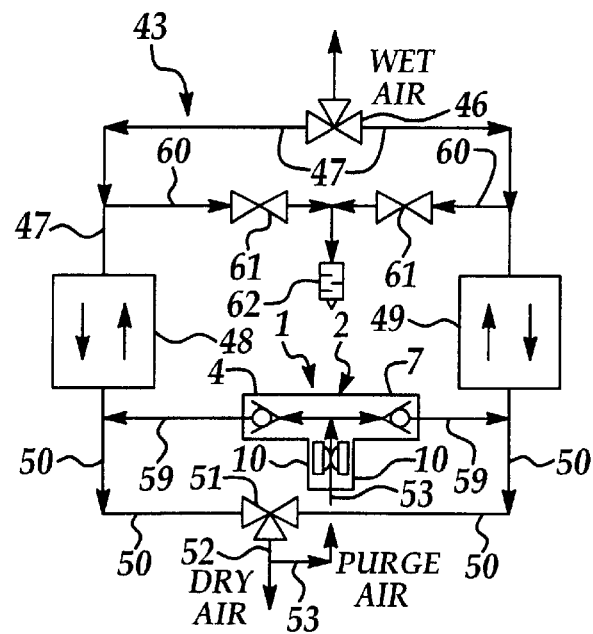
FIG. 7 is a schematic view of an air drying system which incorporates the present invention.
Figure 8:
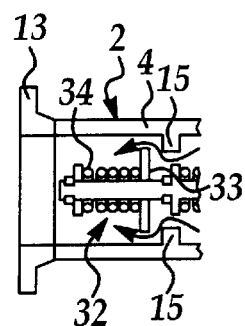
FIG. 8 is a cross-sectional view, partially in section, of a poppet valve element of the present invention, more particularly illustrating opening of the poppet valve responsive to air or gas pressure against the valve.

An air drying system which incorporates the combination 1 of the present invention is generally indicted by reference numeral 43 in FIG. 7. Accordingly, the flow restrictor arm 10 of the housing 2 is connected to the dry air purge line 53, and the first poppet valve arm 4 and the second poppet valve valve arm 7 of the housing 2 are connected to the respective purge air return lines 59, of the air drying system 43. Under circumstances in which the desiccant in the working chamber of the first desiccant chamber 48 becomes saturated with moisture and needs drying, the second desiccant chamber 49 remains functional and continues to dry air and feed the dried air to the dry air dispensing line 52, while flow of wet air from the wet air line 47 into the working chamber of the first desiccant chamber 48 stops. A drop in air pressure is simultaneously induced in the regenerating chamber of the first desiccant chamber 48, and this drop in air pressure causes dry purge air to flow from the dry air purge line 53 and into the flow restrictor arm interior 11 and housing interior 3 of the combination 1, through the air flow orifice 21 as illustrated in FIGS. 3 and 4. The air in the housing interior 3 pushes against the valve disc 33 of the first poppet valve 31, disengaging the valve disc 33 from the poppet valve retainer flange 15 as illustrated in FIG. 8 and facilitating flow of air from the housing interior 3, through the first poppet valve arm interior 5 and to the regenerating chamber of the first desiccant chamber 48. Due to substantially equal air pressure between the housing interior 3 and the regenerating chamber of the second desiccant chamber 49, however, the valve disc 33 of the second poppet valve 32 remains firmly seated against the corresponding poppet valve retainer flange 15 and prevents backflow of air from the second desiccant chamber 49 into the housing interior 3 of the combination 1.

Figure 6:
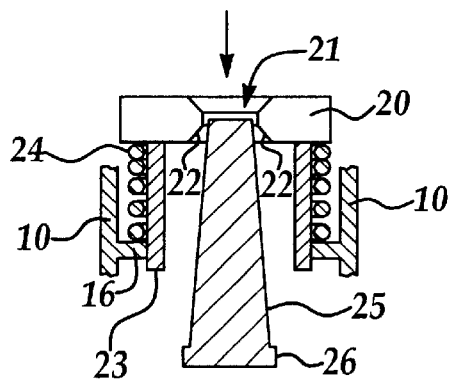
FIG. 6 is a sectional view of the air flow restrictor assembly component of the present invention, as shown in FIG. 4, more particularly illustrating partial restriction of air flow through the assembly.

As the dry purge air flows from the dry air purge line 53 and into the flow restrictor arm interior 11 of the housing 2, the air pushes against the orifice poppet 20 of the air flow restrictor assembly 19, thereby causing the air flow orifice 21 approach the upper end of the taper cone 25, as illustrated in FIG. 6. This restricts the flow area available for the flowing dry purge air through the air flow orifice 21, and the resulting restriction in air flow is directly proportional to the pressure differential or gradient between the flow restrictor arm interior 11 and the regenerating chamber of the first desiccant chamber 48. Accordingly, when the pressure gradient or differential is relatively low, the restrictor spring 24 is in the extended configuration of FIGS. 3 and 4, and the air flows freely through the flow restrictor arm interior 11, housing interior 3, open first poppet valve 31 and first poppet valve arm interior 5, and to the regenerating chamber of the first desiccant chamber 48. When the air pressure differential between the flow restrictor arm interior 11 and the regenerating chamber of the first desiccant chamber 48 is relatively large, the air pushes against the orifice poppet 20 and compresses the restriction spring 24 as the air flow orifice 21 approaches and may receive the stationary tip of the taper cone 25, as illustrated in FIG. 6, to increasingly retard the flow of air through the flow restrictor arm interior 11. Conversely, as the air pressure differential decreases, the restrictor spring 24 partially or completely overcomes the opposing air pressure against the orifice poppet 20 and pushes the orifice poppet 20 and the air flow orifice 21 away from the tip of the taper cone 25, as illustrated in FIG. 4. Consequently, the air flow restriction assembly 19 facilitates a substantially constant, uniform and smooth flow of dry purge air through the housing 2 and to the first desiccant chamber 48 to dry or regenerate the desiccant in the regenerating chamber of the first desiccant chamber 48. Such a constant air flow serves to both increase purge efficiency and decrease purge time and air volume.

At the end of the desiccant drying or re-generating process in the regenerating chamber of the first desiccant chamber 48, the air pressure between the regenerating chamber and the flow restrictor arm interior 11 is substantially equal, and the valve spring 34 of the first poppet valve 31 biases the valve disc 33 against the poppet valve retainer flange 15 to again seal the housing interior 3 from the first poppet valve arm interior 5. Simultaneously, the restrictor spring 24 of the air flow restrictor assembly 19 becomes fully extended and urges the orifice poppet 20 against the retainer ring 27. Normal air-drying operation of the first desiccant chamber 48 resumes, and saturated desiccant in the second desiccant chamber 49 can then be dried in the regenerating chamber thereof. This is accomplished by facilitating flow of dry purge air from the dry air purge line 53 through the air flow orifice 21, open second poppet valve 32 and second poppet valve arm interior 8 of the combination 1 and to the regenerating chamber of the second desiccant chamber 49, in the manner and sequence heretofore described with respect to the desiccant-regenerating process of the first desiccant chamber 48.

While the prefered embodiments of the invention have been described above, it will be recognized and understood that various modifications may be made in the invention and the appended claims are intended to cover all such modifications which may fall within the spirit and scope of the invention.

Having described my invention with the particularity set forth above, I claim:

1. A double directional valve and flow restriction combination, comprising:

a housing for receiving a gas;

an orifice poppet slidably mounted between first and second positions in said housing, said orifice poppet having an air flow orifice for flow of the gas through said orifice poppet;

a poppet bias mechanism normally biasing said orifice poppet in said first position;

a support provided in said housing;

a taper cone carried by said support and disposed adjacent to said air flow orifice;

wherein said air flow orifice approaches said taper cone as said orifice poppet moves from said first position toward said second position;

wherein proximity of said air flow orifice with said taper cone and restriction of flow of the gas through said air flow orifice is directly proportional to the pressure of the gas;

a first valve carried by said support in said housing; and a second valve carried by said support in said housing in spaced-apart relationship to said first valve.

2. The combination of claim 1 wherein said first valve and said second valve each comprises a valve disc and a disc bias mechanism normally biasing said valve disc against said housing.

3. The combination of claim 1 wherein said poppet bias mechanism comprises a coil spring.

4. The combination of claim 3 wherein said first valve and said second valve each comprises a valve disc and a disc bias mechanism normally biasing said valve disc against said housing.

5. The combination of claim 1 wherein said support comprises a holding block provided in said housing and wherein said taper cone, said first valve and said second valve are mounted on said holding block.

6. The combination of claim 5 wherein said first valve and said second valve each comprises a valve disc and a disc bias mechanism normally biasing said valve disc against said housing.

7. The combination of claim 5 wherein said poppet bias mechanism comprises a coil spring.

8. The combination of claim 7 wherein said first valve and said second valve each comprises a valve disc and a disc bias mechanism normally biasing said valve disc against said housing.

9. A double directional valve and flow restriction combination, comprising:
- a generally tee-shaped housing having a first valve arm, a second valve arm and a flow restriction arm between said first valve arm and said second valve arm for receiving a gas;
- an air flow restrictor mechanism provided in said flow restriction arm for varying a flow rate of the gas into said flow restriction arm;
- an elongated valve mount rod provided in said housing adjoining said air flow restrictor mechanism;
- first and second valve retainer flanges provided in said housing in spaced-apart relationship to each other;
- first and second valve discs slidably engaging said valve mount rod in spaced-apart relationship to each other;
- a first valve bias mechanism provided on said valve mount rod and normally biasing said first valve disc against said first valve retainer flange; and
- a second valve bias mechanism provided on said valve mount rod and normally biasing said second valve disc against said second valve retainer flange.

10. The combination of claim 9 wherein said air flow restrictor mechanism comprises an orifice poppet slidably mounted between first and second positions in said flow restriction arm, said orifice poppet having an air flow orifice for flow of the gas through said orifice poppet; a poppet bias mechanism normally biasing said orifice poppet in said first position; and a taper cone provided in said housing for restricting said flow of the gas through said orifice poppet responsive to displacement of said orifice poppet toward said second position.

11. The combination of claim 9 comprising a holding block provided in said housing and wherein said valve mount rod extends through said holding block.

12. A double directional valve and flow restriction combination, comprising:
- a housing having a first valve arm, a second valve arm and a flow restriction arm between said first valve arm and said second valve arm for receiving a gas;
- an air flow restrictor mechanism provided in said flow restriction arm for varying a flow rate of the gas into said flow restriction arm;
- an elongated valve mount rod provided in said housing;
- first and second valve retainer flanges provided in said housing in spaced-apart relationship to each other;
- first and second valve discs slidably engaging said valve mount rod in spaced-apart relationship to each other;
- a first valve bias mechanism provided on said valve mount rod and normally biasing said first valve disc against said first valve retainer flange;
- a second valve bias mechanism provided on said valve mount rod and normally biasing said second valve disc against said second valve retainer flange;
- a holding block provided in said housing and wherein said valve mount rod extends through said holding block; and
- wherein said air flow restrictor mechanism comprises an orifice poppet slidably mounted between first and second positions in said flow restriction arm, said orifice poppet having an air flow orifice for flow of the gas through said orifice poppet; a poppet bias mechanism normally biasing said orifice poppet in said first position; and a taper cone provided on said holding block in said housing for restricting said flow of the gas through said orifice poppet responsive to displacment of said orifice poppet toward said second position.

13. A double directional valve and flow restriction combination, comprising:
- a housing having a first valve arm, a second valve arm and a flow restriction arm between said first valve arm and said second valve arm for receiving a gas;
- a holding block provided in said housing;
- an air flow restrictor mechanism provided in said flow restriction arm adjoining said holding block for varying a flow rate of the gas into said flow restriction arm;
- an elongated valve mount rod slidably engaging said holding block;
- first and second valve retainer flanges provided in said housing in spaced-apart relationship to each other;
- first and second valve discs slidably engaging said valve mount rod in spaced-apart relationship to each other;
- a first valve bias mechanism provided on said valve mount rod and normally biasing said first valve disc against said first valve retainer flange;
- a second valve bias mechanism provided on said valve mount rod and normally biasing said second valve disc against said second valve retainer flange;
- first and second retainer discs provided on said valve mount rod; and
- first and second spacer springs interposed between said first retainer disc and said holding block and said second retainer disc and said holding block, respectively.

14. The combination of claim 13 wherein said first valve bias mechanism and said second valve bias mechanism comprises a first coiled valve spring and a second coiled valve spring, respectively.

15. The combination of claim 13 comprising housing flanges provided on said first valve arm, said second valve arm and said flow restriction arm, respectively, of said housing.

16. The combination of claim 15 wherein said first valve bias mechanism and said second valve bias mechanism comprises a first coiled valve spring and a second coiled valve spring, respectively.

17. A double directional valve and flow restriction combination, comprising:
- a housing having a first valve arm, a second valve arm and a flow restriction arm between said first valve arm and said second valve arm for receiving a gas;
- an air flow restrictor mechanism provided in said flow restriction arm for varying a flow rate of the gas into said flow restriction arm;
- a holding block provided in said housing;
- an elongated valve mount rod slidably engaging said holding block;
- first and second valve retainer flanges provided in said housing in spaced-apart relationship to each other;

first and second valve discs slidably engaging said valve mount rod in spaced-apart relationship to each other;

a first valve bias mechanism provided on said valve mount rod and normally biasing said first valve disc against said first valve retainer flange;

a second valve bias mechanism provided on said valve mount rod and normally biasing said second valve disc against said second valve retainer flange;

first and second retainer discs provided on said valve mount rod; and first and second spacer springs interposed between said first retainer disc and said holding block and said second retainer disc and said holding block, respectively; and wherein said air flow restrictor mechanism comprises an orifice poppet slidably mounted between first and second positions in said flow restriction arm, said orifice poppet having an air flow orifice for flow of the gas through said orifice poppet; a poppet bias mechanism normally biasing said orifice poppet in said first position; and a taper cone provided on said holding block in said housing for restricting said flow of the gas through said orifice poppet responsive to displacment of said orifice poppet toward said second position.

18. A double directional valve and flow restriction combination, comprising:

a housing having a first valve arm, a second valve arm and a flow restriction arm between said first valve arm and said second valve arm for receiving a gas;

an air flow restrictor mechanism provided in said flow restriction arm for varying a flow rate of the gas into said flow restriction arm;

a holding block provided in said housing;

an elongated valve mount rod slidably engaging said holding block;

first and second valve retainer flanges provided in said housing in spaced-apart relationship to each other;

first and second valve discs slidably engaging said valve mount rod in spaced-apart relationship to each other;

a first valve bias mechanism provided on said valve mount rod and normally biasing said first valve disc against said first valve retainer flange;

a second valve bias mechanism provided on said valve mount rod and normally biasing said second valve disc against said second valve retainer flange;

first and second retainer discs provided on said valve mount rod; and first and second spacer springs interposed between said first retainer disc and said holding block and said second retainer disc and said holding block, respectively;

wherein said first valve bias mechanism and said second valve bias mechanism comprises a first coiled valve spring and a second coiled valve spring, respectively; and wherein said air flow restrictor mechanism comprises an orifice poppet slidably mounted between first and second positions in said flow restriction arm, said orifice poppet having an air flow orifice for flow of the gas through said orifice poppet; a poppet bias mechanism normally biasing said orifice poppet in said first position; and a taper cone provided on said holding block in said housing for restricting said flow of the gas through said orifice poppet responsive to displacment of said orifice poppet toward said second position.

19. A double directional valve and flow restriction combination, comprising:

a housing having a first valve arm, a second valve arm and a flow restriction arm between said first valve arm and said second valve arm for receiving a gas;

an air flow restrictor mechanism provided in said flow restriction arm for varying a flow rate of the gas into said flow restriction arm;

a holding block provided in said housing;

an elongated valve mount rod slidably engaging said holding block;

first and second valve retainer flanges provided in said housing in spaced-apart relationship to each other;

first and second valve discs slidably engaging said valve mount rod in spaced-apart relationship to each other;

a first valve bias mechanism provided on said valve mount rod and normally biasing said first valve disc against said first valve retainer flange;

a second valve bias mechanism provided on said valve mount rod and normally biasing said second valve disc against said second valve retainer flange;

first and second retainer discs provided on said valve mount rod;

first and second spacer springs interposed between said first retainer disc and said holding block and said second retainer disc and said holding block, respectively;

housing flanges provided on said first valve arm, said second valve arm and said flow restriction arm, respectively, of said housing; and wherein said air flow restrictor mechanism comprises an orifice poppet slidably mounted between first and second positions in said flow restriction arm, said orifice poppet having an air flow orifice for flow of the gas through said orifice poppet; a poppet bias mechanism normally biasing said orifice poppet in said first position; and a taper cone provided on said holding block in said housing for restricting said flow of the gas through said orifice poppet responsive to displacment of said orifice poppet toward said second position.

20. A double directional valve and flow restriction combination, comprising:

a housing having a first valve arm, a second valve arm and a flow restriction arm between said first valve arm and said second valve arm for receiving a gas;

an air flow restrictor mechanism provided in said flow restriction arm for varying a flow rate of the gas into said flow restriction arm;

a holding block provided in said housing;

an elongated valve mount rod slidably engaging said holding block;

first and second valve retainer flanges provided in said housing in spaced-apart relationship to each other;

first and second valve discs slidably engaging said valve mount rod in spaced-apart relationship to each other;

a first valve bias mechanism provided on said valve mount rod and normally biasing said first valve disc against said first valve retainer flange;

a second valve bias mechanism provided on said valve mount rod and normally biasing said second valve disc against said second valve retainer flange;

first and second retainer discs provided on said valve mount rod; and first and second spacer springs interposed between said first retainer disc and said holding block and said second retainer disc and said holding block, respectively;

housing flanges provided on said first valve arm, said second valve arm and said flow restriction arm, respectively, of said housing;

wherein said first valve bias mechanism and said second valve bias mechanism comprises a first coiled valve spring and a second coiled valve spring, respectively; and wherein said air flow restrictor mechanism comprises an orifice poppet slidably mounted between first and second positions in said flow restriction arm, said orifice poppet having an air flow orifice for flow of the gas through said orifice poppet; a poppet bias mechanism normally biasing said orifice poppet in said first position; and a taper cone provided on said holding block in said housing for restricting said flow of the gas through said orifice poppet responsive to displacment of said orifice poppet toward said second position.

* * * * *